United States Patent

[11] 3,610,289

| [72] | Inventor | Trevor F. Moss<br>Tidal Waters, Noss Mayo, South Devon, England |
|---|---|---|
| [21] | Appl. No. | 709,773 |
| [22] | Filed | Mar. 1, 1968 |
| [45] | Patented | Oct. 5, 1971 |
| [32] | Priority | Mar. 3, 1967 |
| [33] | | Great Britain |
| [31] | | 10170/67 |

[54] AIR LINE FITTED WITH INTERNAL COIL SPRINGS
2 Claims, 5 Drawing Figs.

[52] U.S. Cl. ................................................. 138/110, 138/131
[51] Int. Cl. ............................................. F16l 11/10
[50] Field of Search .......................................... 138/103, 109, 110, 131; 267/166, 168, 180

[56] References Cited
UNITED STATES PATENTS

| 165,324 | 7/1875 | Greacen, Jr. | 138/131 |
| 3,021,871 | 2/1962 | Rodgers | 138/118 |
| 2,277,864 | 3/1942 | Horvath | 138/110 |
| 1,367,246 | 2/1921 | Ewald | 138/110 |
| 2,986,169 | 5/1961 | McCormick | 138/109 |

FOREIGN PATENTS

| 626,836 | 7/1949 | Great Britain | 138/110 |
| 257,158 | 4/1964 | Netherlands | 138/109 |
| 57,563 | 7/1923 | Sweden | 138/110 |

Primary Examiner—Laverne D. Geiger
Assistant Examiner—Richard J. Sher
Attorney—Watson, Cole, Grindle & Watson ABSTRACT: An extensible coiled air line is provided for use with articulated vehicles. The air line consists of a helically coiled tube of thermoplastics material in which metal coil springs extend partially along the air line from each end thereof. The purpose of the coil springs is to prevent kinking of the air line when the air line is subjected to large extensions. The coil springs are normally variable rate springs, for example, tapered over their inner end portions, in order to prevent weakness developing in the tube at the inner ends of the springs. In one arrangement the two coil springs are connected by a resilient wire which passes through the intervening coils of the tube.

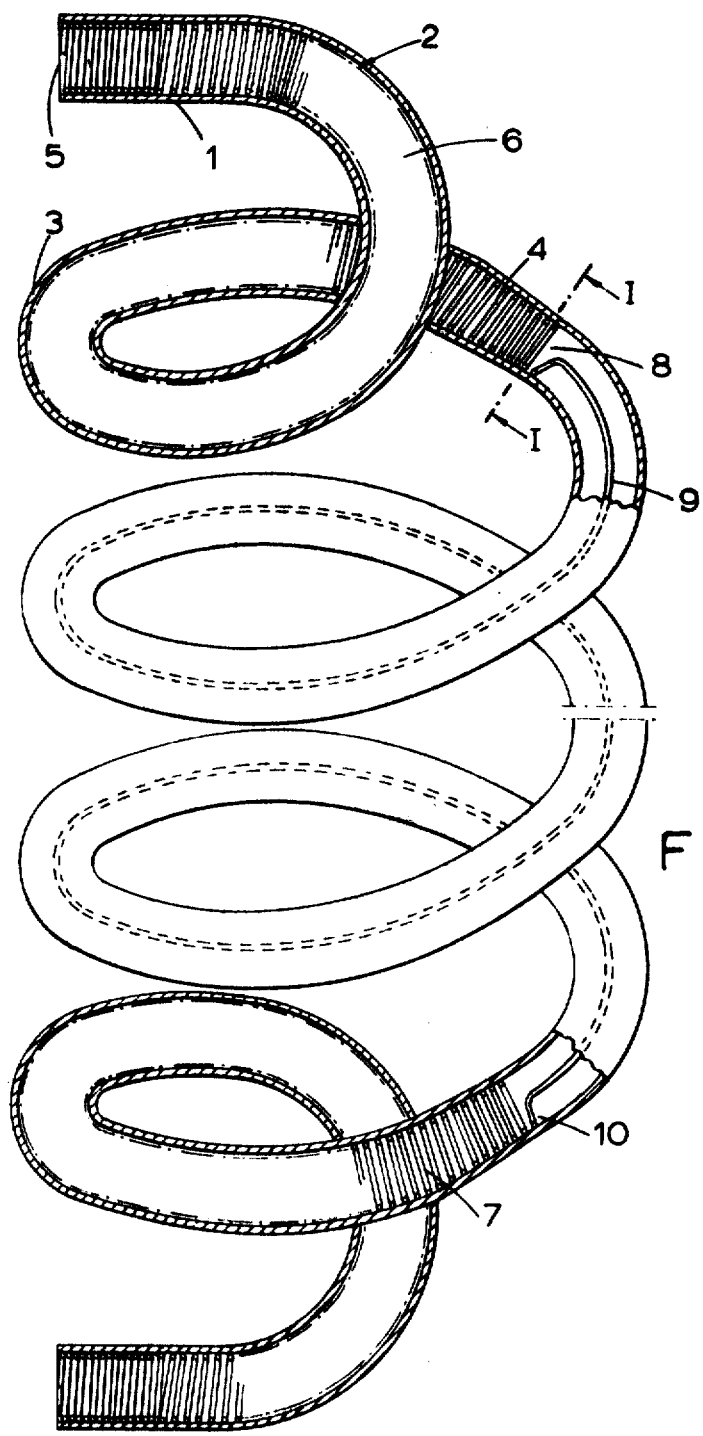
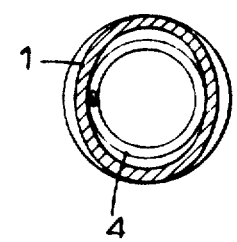
FIG. 1a.
FIG. 1.

AIR LINE FITTED WITH INTERNAL COIL SPRINGS

BACKGROUND OF THE INVENTION

Extensible coiled air lines for connecting the trailer braking system in the trailer of an articulated vehicle with the brake-actuating means in the tractor have become increasingly widely used. Conventional coiled air lines are made from a thermoformable plastics tube, such as nylon or polypropylene, by heating the tube to a temperature at which it is plastic, forming the tube into a helical coil or a mandrel while the tube is hot and then allowing it to cool while wrapped around the mandrel. As a result of this treatment, the helically coiled configuration is permanently retained by the tube and in use the air line acts as a weak spring in that it extends and retracts to accommodate changes in the separation of the points of connection of the air line to the tractor and trailer as the vehicle is maneuvered. In practice, air lines for articulated vehicles of average size are made by coiling nylon tubes approximately 25 feet in length, the diameter of the coils being approximately 3 to 6 inches. It is found that a tube of this length is necessary in order to ensure that the air line is not overloaded and thus kinked when the points of connection at the tractor and trailer are separated to the maximum extent, which sometimes occurs when a vehicle is being reversed. Air lines of such length have two main disadvantages; firstly the incorporate a large amount of expensive plastics material and secondly they make it difficult to reduce the time delay between the actuation of the brake pedal and the operation of the trailer brakes since this time is dependent upon that necessary for air to pass along the air line.

SUMMARY OF THE INVENTION

The present invention seeks to overcome these disadvantages of conventional air lines.

According to the present invention there is provided an extensible air line which comprises a helically coiled tube of thermoplastics material having a metal coil spring located therein and extending from one end of the air line partially along the air line. It is found that in practice the spring need not extend more than a short way beyond the first bend in the air line, since I have discovered that the major stresses occur in the region of the first bend of the first coil in the air line and the point of connection to the tractor or trailer.

If a normal length of coil spring is employed there is a tendency for the air line to be deformed at the point where the spring ends and over a period of time this could lead to weakening of the tube at that point. It has been found that this problem can be overcome by utilizing a coil spring having a variable rate. When using coil springs of this type it is found that there is no significant deformation of the air line in the region of the inner end of the spring. The variable-rate coil spring may be tapered over a portion of its inner end or, alternatively, the coils of the spring may gradually increase in separation over a portion of the inner end of the spring. As a further alternative the coils of the coil spring may be upset over a portion of the inner end of the spring so that the angles which the coils at the inner end make with the coils of the major portion of the spring increase progressively towards the inner end of the spring.

Air lines in accordance with the present invention may be made from substantially shorter lengths of tube and it has been found in practice that such an air line formed from a tube only about 14 feet in length performs better than a conventional air line made from 25-feet length of tube. As a result of my discovery that major stresses in the air line occur in the region of the first bend in the air line and at the points of connection to the trailer and tractor, it has been possible to reduce the thickness of the walls of the tube since the tube is supported by the springs at the points of major stress. This results in an additional saving in materials and enables a greater flow of air along the tube.

Preferably the coil springs which are inserted in the air lines are constructed in such a way that the coils are more closely spaced at their outer end than over the main part of the spring. As a result the spring is stiffer in the region of the point of connection of the air line to the tractor or trailer and absorbs the stresses on the air line at this point.

In practice, the air line in accordance with the present invention will be fitted with a coil spring at both ends. Air lines in accordance with the present invention have the advantage that they can be fitted with drive-in type fittings for connection to the tractor and trailer service of articulated vehicle. This is because the presence of the spring stiffens the ends of the air line. In one arrangement the drive-in type fittings may be provided with a spigot which when fitted into the air line is spaced from the wall of the air line by an amount such that the outer end of the coil spring is accommodated between the spigot and the tube. Conventional types of drive-in fittings may however be used and in all cases a sleeve of thermoplastics material may be positioned over the junction between the inner end of the fitting and the outer end of the spring, the sleeve being sized so as to retain the fitting in place.

Compression fittings may also be used and the presence of the spring enables the relatively thin-walled tube to withstand the presence exerted by the compression fitting.

In a further embodiment of the present invention a coil spring may be located at each end of the air line and the coil springs connected by a resilient wire which passes axially through the intervening coils of the tube.

BRIEF DESCRIPTION OF DRAWINGS

FIG. 1 is a section through an air line fitted with variable rate springs at each end;

FIG. 1a is a section taken on the line I—I in FIG. 1;

DESCRIPTION OF PREFERRED EMBODIMENTS

Figure 2:
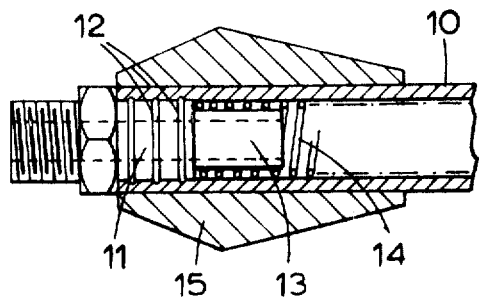
FIG. 2 is a section through part of an air line fitted with a spring and a drive-in type fitting.

Referring to FIG. 1 of the drawings, an air line comprises a helically coiled tube 1 of thermoformable plastic material. The tube 1 contains a spring 2 extending from one end of the tube past the first bend 3 of the first coil of the tube. As shown, the inner end of the spring is tapered at 4. The outer end 5 of the spring 2 has coils which are more closely spaced than the coils 6 of the main part of the spring 2. In a typical case the spring will be about 1 foot long and the more closely spaced coils at 5 will extend for about 2 inches and the tapered portion at 4 will extend for about 1 inch. The other end of the tube 1 is fitted with a spring 7 which is similar in all respects to the spring 2. The final coil 8 at the inner end of the spring 2 is connected to a resilient wire 9, which extends through the intervening coils of the tube 1 between the springs 2 and 7 and the other end of the wire 9 is connected to the final coil 10 of the spring 7. The wire 9 is formed integrally with the springs 2 and 7 and in practice the assembly comprising the springs 2 and 7 and the wire 9 is manufactured by coiling a spring at each end of a length of resilient wire. As shown in FIG. 1a the tube is slightly oval in shape between the two springs 2 and 7 but this is not a disadvantage and conventional air lines are oval in section along their entire length as a result of the method of manufacture. It is found that by virtue of the presence of the resilient wire 9 in the tube 1 it is possible to manufacture satisfactory airlines from comparatively soft thermoplastic materials, such as polyurethane which could not normally be used for the manufacture of air lines since they do not possess sufficient resilience in themselves to extend and retract, the resilient wire 9 performing this function. Compression fittings may be fitted to each end of the tube 1 although the presence of the springs 2 and 7 enables the use of the less expensive drive-in type fittings as shown in FIG. 2. It is found that the presence of springs at the ends of the tube 1 ensures that more reliable connections can be made, even when the air line is subjected to high temperatures. Furthermore, the presence of the springs enables the use of thinner walled tubes than could be used normally with consequential savings in material costs, since the springs provide support in the areas where the tube is most likely to kink.

Referring to FIG. 2, this shows the end of the air line 10 fitted with drive-in type fitting 11. The drive-in type fitting has projections 12 for engaging the inside of the air line 10 and an extended spigot 13 whose diameter is smaller than the internal diameter of the tube 10, so that the end of a coil spring 14 can be fitted snugly between the fitting 11 and the tube 10. A sleeve 15 of plastics material surrounds the junction between the spring 14 and the drive-in fitting 11. The size of the aperture through the sleeve 15 is such that it tightly grips the air line 10 and thus retains the fitting 11 in position. The sleeve 15 can be fitted by heating it and then slipping it over the end of the fitting and tube. It will be appreciated that with the construction shown in FIG. 2, drive-in type fittings can be sued without a point of weakness developing between the end of the spring and the inner end of the drive-in fitting.

Figure 3:
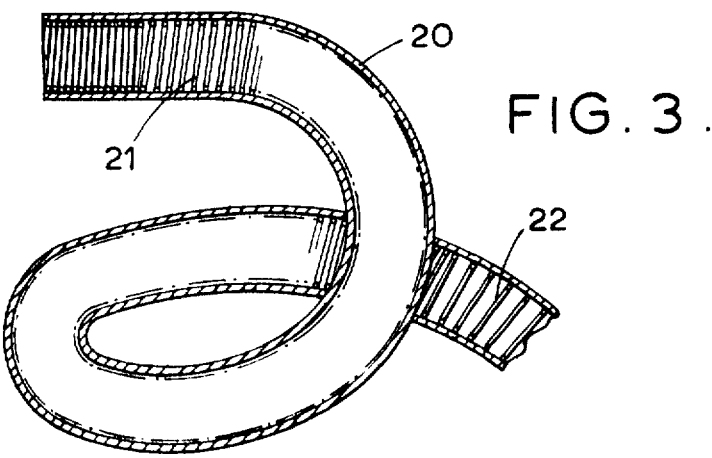
FIG. 3 is a section through part of an air line fitted with a different kind of variable rate spring from that shown in FIG. 1.

Referring to FIG. 3, this shows the end of an airlines 20 fitted with a coil spring 21 having a variable rate. The spring 21 is essentially similar to the coil springs 2 and 7 shown in FIG. 1 except for the innermost portions of the spring. At the innermost portions of the spring the spacing between the coils gradually increases as compared with the spacing of the coils over the major part of the length of the spring.

Figure 4:
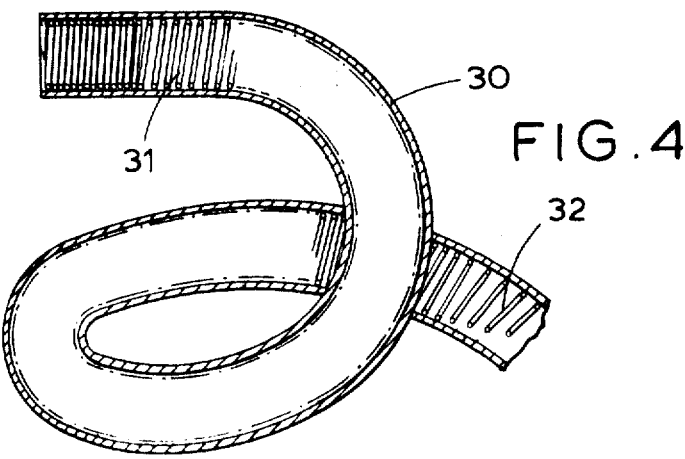
FIG. 4 is a section through part of an air line fitted with a further alternative kind of variable coil spring.

A further arrangement is shown in FIG. 4 in which a spring 31 is retained in the end of an air line 30. The coil spring 31 is essentially the same as the coil springs 2 and 7 shown in FIG. 1 except for the innermost portion 32 of the spring. At the innermost end of the spring 31 however, the end coils are upset so that the angle which the end coils made with the coils of the major part of the spring gradually increases towards the inner end of the spring.

The air line of the present invention may be manufactured in conventional manner from thermoformable plastics material, such as nylon or polypropylene by heating a tube of thermoformable plastics material (for example by immersion in a hot oil bath or in hot water or in an oven in the case of polypropylene) and wrapping the tube in helical fashion round a mandrel while the tube is hot. The tube is allowed to cool while held around the mandrel and after cooling retains its helically coiled shape. Preferably the springs are inserted into each end of the tube prior to coiling in the mandrel. In practice the springs are normally removed from the coiled air lines and fresh springs inserted since it is sometimes difficult to remove traces of water or oil from the springs if the tubes are heated in water or oil.

I claim:

1. An extensible air line comprising a helically coiled tube of thermoformable material having a metal coil spring located therein which extends partially along the length of said tube from opposite ends thereof, each said coil spring having an outer end portion at which the adjacent spring coils are substantially in face-to-face contact and an inner portion at which the spring coils are separated, said inner portion of each said spring thereby having a lower spring rate as compared to said outer portions and said inner portions of each said spring being tapered towards its said free end whereby any tendency for said tube to be deformed at the location of the free ends of each said spring is substantially avoided.

2. An air line according to claim 1 in which the two coil springs are connected by a resilient wire which passes axially through the intervening coils of the tube.